Sept. 18, 1945.　　C. D. PETERSON ET AL　　2,385,231
GEAR SHIFTING MECHANISM
Original Filed Sept. 30, 1942　　3 Sheets-Sheet 1

INVENTORS:
Carl D. Peterson &
BY Elmer J. Barth,
Bodlert Thompson
Attys

Sept. 18, 1945. C. D. PETERSON ET AL 2,385,231
GEAR SHIFTING MECHANISM
Original Filed Sept. 30, 1942    3 Sheets-Sheet 2
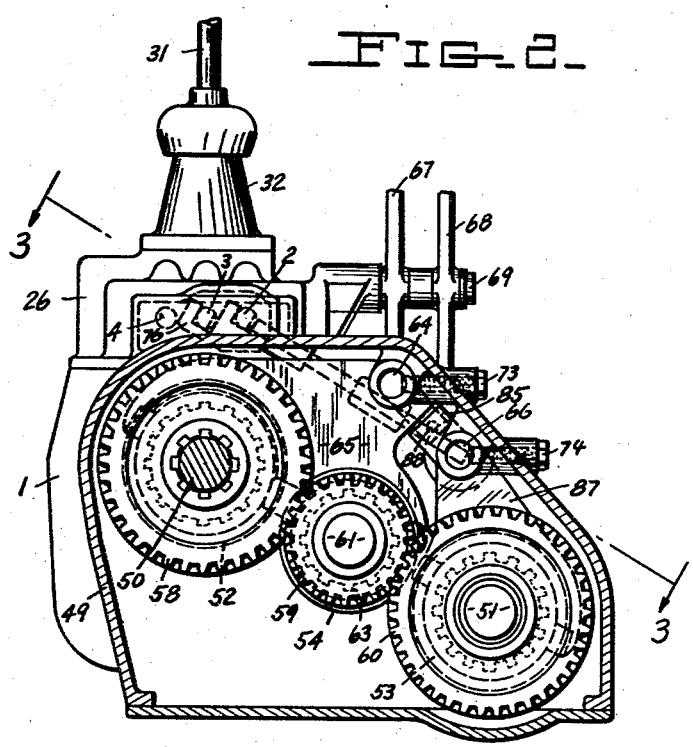
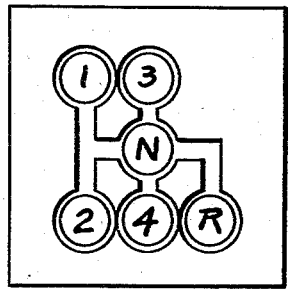
INVENTORS:
Carl D. Peterson &
BY Elmer J. Barth, Sept. 18, 1945.  C. D. PETERSON ET AL  2,385,231
GEAR SHIFTING MECHANISM
Original Filed Sept. 30, 1942  3 Sheets-Sheet 3

INVENTORS.
Carl D. Peterson &
BY Elmer J. Barth

Patented Sept. 18, 1945

2,385,231

UNITED STATES PATENT OFFICE 2,385,231

GEAR SHIFTING MECHANISM

Carl D. Peterson and Elmer J. Barth, Toledo, Ohio

Original application September 30, 1942, Serial No. 460,224. Divided and this application May 30, 1944, Serial No. 537,997

7 Claims. (Cl. 74—477)

This invention relates to shifting mechanism for selective change-speed transmission gearing for motor vehicles, and has for its object a mechanism for shifting two shift rods, when a particular one of the two shift rods is selected and operated, as for instance, in a gearing where reverse is effected by connecting in the first speed train to the output shaft and shifting in an intermediary gear in the first gear train, so that to effect reverse, the first speed shift rod must be shifted into operative position, when the intermediary gear is being shifted into operative position by the operation of the reverse shift rod.

More specifically, the invention has for its object motion transmitting means between the two shift rods which act in conjunction to effect a certain speed, as reverse speed, which means normally idles, or is ineffective to transmit motion when one rod is selected and operated, as the first speed rod, but which becomes operative to transmit motion from the reverse rod to the first speed rod when the reverse rod is selected and shifted. As shifting mechanism usually includes shift rods, this term "shift rod" is used herein, for brevity's sake, and in a broad sense.

The invention further has for its object a shifting mechanism including independently shiftable rods and layers to shift them with means for compelling the shifting of one rod when the other is operated, as a shifting mechanism requiring the shifting in of a front wheel drive when a certain gear ratio is shifted in.

This is a divisional of application of Carl D. Peterson and Elmer J. Barth, Serial Number 460,224, filed September 30, 1942.

The invention consists in the novel features and in the combinations and constructions hereinafter set forth and claimed.

In describing this invention, reference is had to the accompanying drawings in which like characters designate corresponding parts in all the views.

Figure 2 is an elevation looking to the left in Figure 1, the casing or box being in section.

Figure 5 is a chart showing the movement of the selecting and shifting lever for the main gearing.

Figure 1:
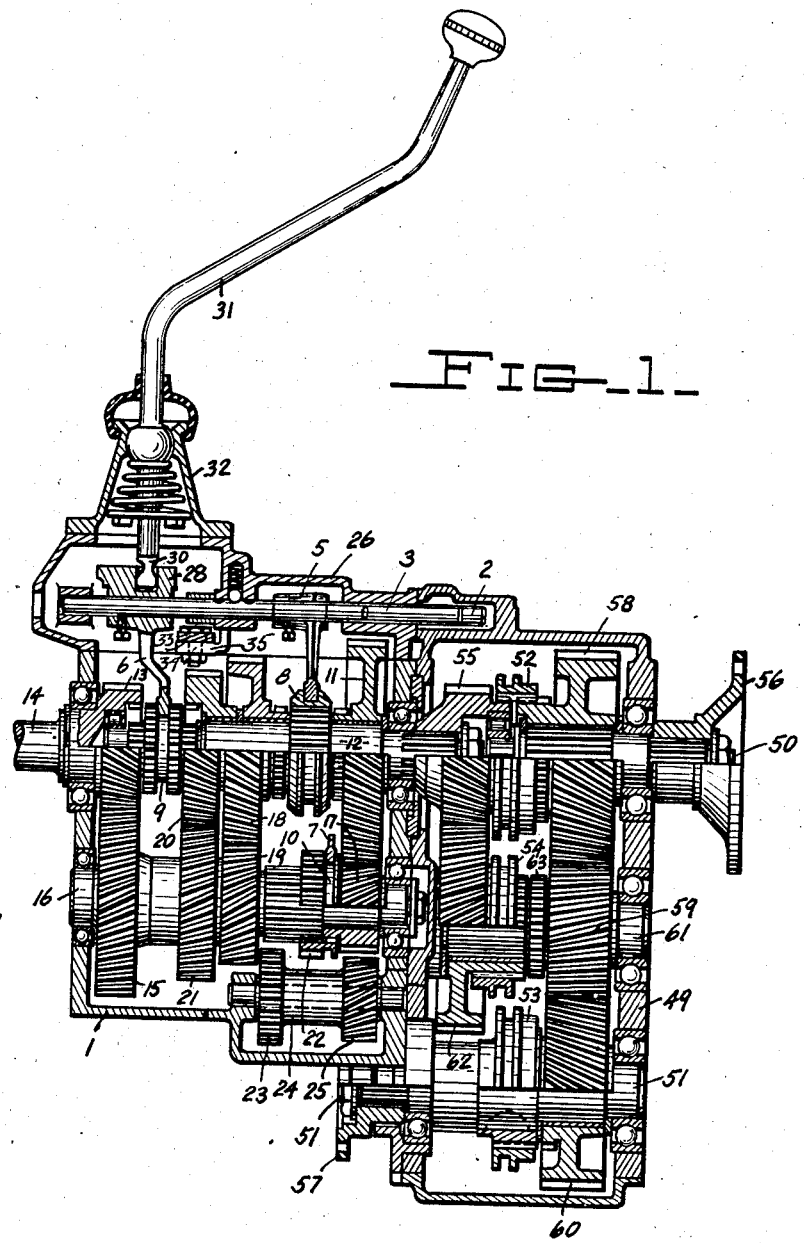
Figure 1 is a longitudinal sectional view of this gearing showing the gear arrangement.
Figure 3:
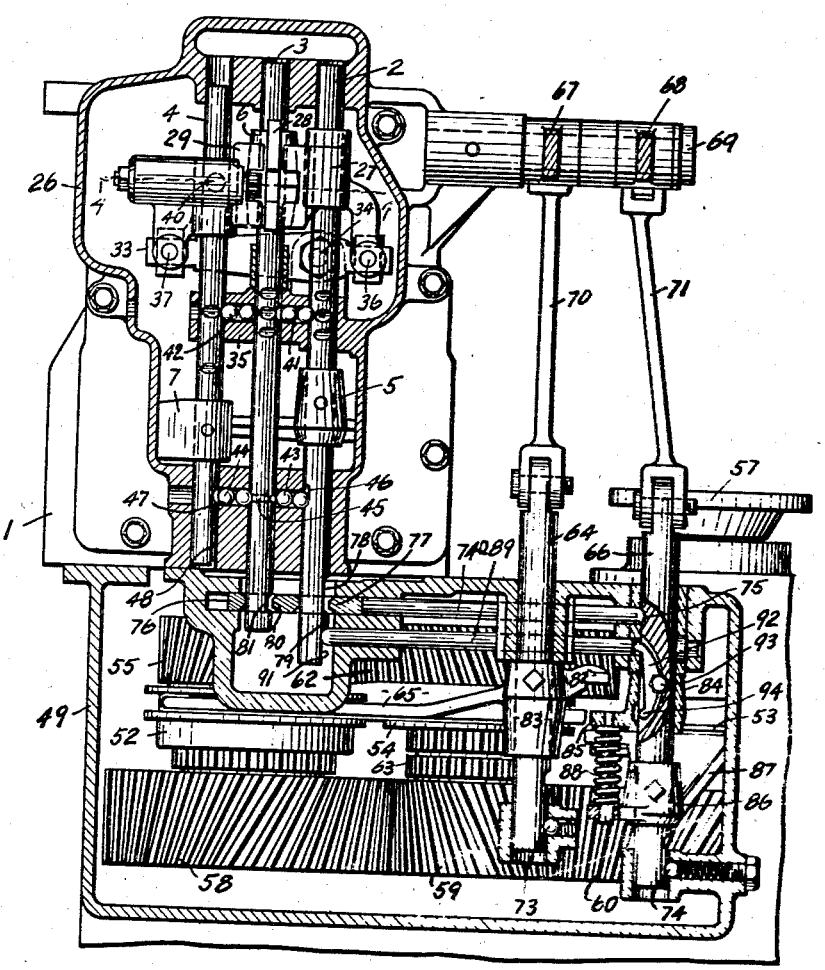
Figure 3 is an enlarged fragmentary sectional view on line 3—3, Figure 2.

1 designates the main gear box, which houses the selective, variable speed gearing operable to produce a plural number of speeds forward, one of which is direct drive, and three forward indirect drives, and one reverse. The mechanism for effecting the gear shifts is here shown as including three shift rods 2, 3 and 4 operating forks 5, 6 and 7, which coact with clutches 8, 9 and 10 respectively. The clutch 8 operated by the rod 2 is shifted to the right (Figure 1) from neutral to clutch gear 11 to the output shaft 12 of the gearing to produce first speed forward through gear 13 on the input shaft 14 of the gearing, gear 15 on the countershaft 16 and gear 17 on the countershaft meshing with the gear 11. The clutch 10 normally stands in position to clutch the gear 17 to the countershaft 16 for all forward speeds.

Shifting of the rod 2 forward, or to the left, shifts the clutch 8 to clutch the gear 18 to the output shaft 12 to produce second speed through the gears 13, 15, countershaft 16 and gear 19 keyed on the countershaft, which gear 19 meshes with the gear 18. Clutch 9 is shifted in opposite directions from neutral by the shift rod 3. Shifting of the clutch 9 to the right clutches gear 20 to the output shaft 12, so that the drive is from the input shaft 14 through gears 13, 15, countershaft 16, gear 21 keyed on the countershaft and meshing with the gear 20. Shifting of the clutch 9 to the left from neutral clutches the input and output shafts 14 and 12 respectively, directly together in direct drive, these shafts being mounted in axial alinement in the gear box with the output shaft 12 having a pilot bearing within the gear 13. Shifting of the reverse rod 4 from neutral shifts the clutch 10, which is also a clutch gear, to now unclutch the countershaft gear 17 from the countershaft 16 and shifts the gear 22 of the clutch 10 into mesh with the gear 23 at one end of a reverse spool 24 having a gear 25 at the other end, which meshes with the gear 11 on the shaft 12.

Through mechanism to be described, when the reverse rod 4 is operated to shift the clutch gear 10 to unclutch the gear 17 and to mesh with the gear 23 of the reverse spool 24, the shift rod 2 is automatically shifted to carry the clutch 8 into first speed position, that is, in position to clutch the gear 11 to the output shaft 12. The input shaft 14 is the main engine clutch shaft and connected through the usual clutch to the crank shaft of the engine of the vehicle.

The shift rods 2, 3, 4 are slidably mounted in a cover 26 of the gear box in the usual manner, and are provided with blocks 27, 28 and 29 thereon formed with notches arranged in transverse alinement when the rods are in neutral position for coacting with the finger 30 of the selecting and shifting lever 31 having a lateral selecting and a fore-and-aft shifting movement. The shifting fork 6 for the third and fourth speed rod 3 is carried by the block 28. The selecting and shifting lever 31 is mounted in any well known manner, as in a tower 32 on the cover 26 of the gear box 1.

As before stated, reverse speed is effected by shifting the first and second speed rod 2 into first speed position, upon the shifting of the reverse rod into reverse position. This automatic shift of the first speed rod 2 is effected by motion transmitting means between the reverse rod 4 and the first and second speed rod 2 and a coupling which operates to couple the reverse rod 4 to the motion transmitting means only when the reverse rod 4 is selected by the finger 30 of the selecting and shifting lever 31. This motion transmitting means consists of a lever 33 (Figure 4) pivoted as at 34 to a bracket extending from a cross-frame member 35 within the cover and pivoted at 36 and 37 to arms on the shifting blocks 27 and 29 respectively. The pivotal joints 36, 37 are such that the ends of the lever and the arms on the block may have a sliding movement during the arcuate movement of the ends of the lever. The block 27 is fixed in any suitable manner to the first and second speed shift rod 2 while the block 29 on the reverse rod 4 is slidably mounted on the rod 4, or the rod 4 is capable of sliding in the block 29, except when the reverse rod 4 has been selected by the finger 30 of the lever 31.

Figure 4:
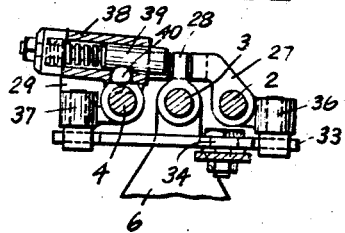
Figure 4 is a sectional view taken approximately on the line of 4—4, Figure 3, of the shifting mechanism and contiguous parts.

As seen in Figure 4, the block 29 on the reverse rod 4 is formed with a guide 38 extending at an angle to the rod 4 crosswise of and above the same, and a spring-pressed plunger 39 is movable in the guide 38, the end of the plunger projecting into the notch of the block 29 into the path of the finger 30 of the selecting and shifting lever 31, so that the plunger is pressed inwardly when the reverse block 29 is selected. The plunger 39 is formed with a cam notch into which a ball 40 extends, the ball being located in a passage opening into the bore of the block 29 through which the rod 4 extends, and the rod is formed with a notch alined with the passage. The length of the passage and the diameter of the ball are such that when the plunger 39 is in normal position, the reverse rod 4 will cam the ball 40 out of the slot in the reverse rod and into the notch of the plunger, so that the block 29 can idle or slide along the rod 4 without shifting it when the first and second speed rod 2 is selected and shifted, but when the reverse block 29 is selected, the finger of the selecting lever shifts the plunger 39, camming the ball 40 out of the notch therein and into the notch in the reverse rod 4, thus locking the block 29 and the reverse rod 4 together, so that now upon shifting of the selected reverse rod 4, the rod 4 will be shifted into reverse position and the motion thereof transferred through the lever 33 to the first and second speed rod 2 to shift it into first speed position.

Means is provided for locking the unselected and unshifted rods from shifting movement, and this means may be of any suitable construction, as balls 41, 42, located in transverse passages in the cross-frame 35 within the cover, the balls 41 coacting with notches in opposing sides of the shift rods 2, 3 and the balls 42 coacting with notches in the opposing shift rods 3, 4. Upon shifting of the first and second speed rod 2, the balls 41 are shifted by the camming action of the notch in the rod 2 into the notch in the rod 3, thus locking the rod 3 from movement, and upon shifting of the rod 3 from neutral, the balls 41, 42 are cammed in opposite directions to enter notches in the rods 2 and 4 and lock them in neutral position. As reverse is effected by shifting the reverse rod 4 when the first and second speed rod is selected and shifted, the reverse rod is locked from shifting movement by similar balls 43, 44, the balls 43 being located in a transverse passage between the rods 2 and 3 and coacting with notches in the opposite sides of these rods, and the balls 44 being located in a passage between the rod 3 and reverse rod 4 and coacting with notches in opposing sides, and a plunger 45 extending transversely through the rod 3 and long enough to transmit the transverse movement of one set of balls 43, 44 to the other, when either the rod 2 or the rod 4 is shifted. When only the first and second speed rod 2 is selected and shifted, the reverse rod 4 is thus locked from shifting movement. In order that the first and second speed rod may not be locked, when the reverse rod is selected and shifted, because of the motion transmitting lever 33, the notch 46 in the first and second speed rod is wide enough to permit the shift rod 2 to move far enough toward first speed position to allow the ball 44 which coacts with the reverse rod 4 to clear the hump or projection 47 and enter a groove or long notch 48 in the reverse rod, so that the rod 2 is not locked, and the motion of the reverse rod may be transferred thereto.

49 designates the transfer gear box. This is mounted on the rear end of the main gear box 1. The transfer gearing includes a tail shaft 50 and a second tail shaft 51, a shiftable element or a clutch 52 operable to connect the tail shaft 50 with the output shaft 12 of the main gearing, a gear train through which the tail shaft 51 may be driven with the tail shaft 50, a second shiftable element or clutch 53 operable to connect and disconnect the second tail shaft 51 in and out of the train or from being actuated with the tail shaft 50, and another gear train for driving both tail shafts from the output shaft 12 of the gearing at a lower speed including a third shiftable element 54 shiftable to connect and disconnect the tail shafts from the output shaft 12 through the low speed gearing. The tail shaft 50 is arranged in alinement with the output shaft 12, and has a pilot bearing in a gear 55 mounted on the end of the output shaft, which projects into the transfer gear box 49. The shiftable element or clutch 52 is shiftable to clutch the shafts 12 and 50 directly together. The tail shaft 50 is provided with a suitable means, as 56, for coupling the propeller shaft, or other means which is connected to the rear drive shaft of the vehicle. The other tail shaft 51 is provided with a suitable coupling means, as 57, for connection to the front steering wheels of the vehicle to drive the same, when the vehicle is to be driven by both the tracks and the steering wheels, when the clutch 52 clutches the output shaft 12 and tail shaft 50 directly together, this being called "high." The tail shaft 51 is driven in high from the tail shaft 50 through gears 58, 59 and 60 mounted respectively on the tail shaft 50, an intermediate shaft 61 and on the second tail shaft 51. The clutch 52, when in engaged position, operates to clutch the gear 58 to the gear 55 on the output shaft, the gear 58 being splined on the tail shaft 50. The gear 60 is rotatably mounted on the tail shaft 51, and when the clutch 53 is in engaged position, the tail shaft 51 will be driven with the tail shaft 50 through the gears 58, 59 and 60. When the clutch 53 is disengaged and the clutch 52 engaged, only the tail shaft 50 will be driven. The tail shafts 50 and 51 are driven through a low gear ratio, through a gear 62 rotatably mounted on the intermediate shaft 61 and clutchable thereto by the clutch 54 on the hub of the gear 62 and shiftable into clutching engagement with a clutch ring 63 on the shaft or gear 59. When the clutch 54 is shifted into engagement with the clutch ring 63 and the clutch 53 is engaged, both tail shafts are driven from the output shaft 12 through the gear 55, gear 62, shaft 61 and gear 59 which meshes with both the gears 58 and 60 on the tail shafts respectively. The clutches 52 and 54 are shifted by a double fork 65 in unison, so that when either is shifted out of clutching engagement, the other is shifted into clutching engagement.

The shifting mechanism for the transfer gearing includes a shift rod 64 common to the first and third clutches 52, 54 and connected thereto by the double fork 65. The clutch 53, which controls the cutting in and out of the front wheel drive, is effected by a shift rod 66, the rods 64 and 66 being mounted to slide in the transfer gear box 49 parallel to each other and parallel to the shift rods 2, 3 and 4. The operation of the rod 66, which controls the cutting in and out of the front wheel drive or the tail shaft 51, is controlled by the shift rods of the main gear box through interlocking means to be described. The front wheel drive must be in with first speed in the main gear effected through the shift rod 2 and low in the transfer gear box effected by shifting in of the third clutch 54, or must be in reverse effected by the rod 4 of the main gear box and low effected by the third clutch 54 of the transfer box. The front wheel drive is optional with first gear in the main gear box effected by the shift rod 2 and high in the transfer gear box effected by the clutch 52, or with reverse in the main gear box effected by the reverse rod 4 and high in the transfer gear box through the clutch 52. However, low in the transfer box through the clutch 54 is optional in all speeds of the main transmission.

First, second, third and fourth speeds forward and one reverse is obtained through the gears of the main gear box, and also four additional under-drives or eight forward speeds in all, and one reverse, may be obtained through shifting in of the clutch 54.

The rods 64 and 66 are operated by levers 67 and 68 mounted on a stud 69 on the side of the main gear box and links 70 and 71 between the levers and the rods 64 and 66 respectively. The rods are held in starting position by any suitable means, as spring-pressed poppets 73, 74. The interlock for compelling the use of front wheel drive when in first gear in the main gear box and low in the transfer box or reverse in the main gear box and low in the transfer box, as here shown, comprises a lock rod 740 suitably guided in a passage provided in the transfer case 49 and having one end arranged to enter a cam-shaped notch 75 in the shift rod 66, when the shift rod is inoperative or in "out" position, the rod having a plate 76 at its other end formed with a passage through which the first and second speed rod 2 extends, the plate having a tooth 77 at one side of the rod 2 for entering a cam-shaped notch 78 in the rod 2 wide enough to receive the tooth 77 when the rod 2 is shifted into first speed position. When, however, the rod 2 is shifted into second speed position, the lift or hump 79 rides up on the tooth 77 and holds the rod 740 from endwise movement, and hence locked in the notch 75 of the rod 66. Conversely the first and second speed rod is locked from shifting into second speed position, when the shift rod 66 is in clutch engaged position. The plate 76 also has a passage through which the third and fourth speed rod 3 extends and formed with a tooth 80 for entering a cam-shaped notch 81 in the rod 3, so that when third or fourth speed shift rod is shifted, the high portion thereof rides up on the tooth 80 and locks the lock rod 740 from movement. If the shift rod 66 is in shifted position to cut in front wheel drive, when an attempt is made to shift the rod 2 into second speed forward, or the rod 3 into third or fourth speed forward, such attempt will be blocked by the fact that the lock rod 740 is shifted completely into the notches 78 and 81, and hence locks the rods 2, 3 from movement. However, the shift may be made into first speed forward, because of the wide slot 78 while the rod 66 is shifted into front wheel drive position. As the first and second speed rod 2 is shifted into first speed position by the selecting and shifting of the reverse rod 4, the front wheel drive shift rod 66 is free to be shifted, when the shift rod 4 is in reverse position, as then the first speed and second speed rod 2 being in first speed position, the tooth 77 of the lock rod 740 is alined with the wide notch 78.

In order to compel front wheel drive to be in with low gear ratio of the transfer box, when the gearing of the main gear box is in first speed forward or reverse, means is provided for blocking shifting of the rod 64, when the rod 66 is in its position assumed when the front wheel drive clutch 53 is disengaged or unclutched from the gear 60. This means comprises an arm 82 on the hub 83 of the double fork 65, a sleeve 84 slidably mounted on the rod 66 and having a shoulder 85 extending into the path of the arm 82, the shoulder being connected by a tie or push rod 88 to the hub 86 of the fork 87 which shifts the front wheel drive clutch 53, the hub 86 being keyed to the rod 66, and an interlock operable by the rod 2 when shifted to first speed position to lock the sleeve 84 to the rod 66, so that upon operation of the first and second speed rod into first speed position, the lock is operated, and hence, if the rod 64 is shifted, the shoulder 82 will encounter the shoulder 85, and additional movement will shift the rod 66 with the sleeve 84, and hence shift the fork collar 86 to shift the fork 87 and front wheel clutch 53 into engaged position, or will compel the shifting of the rod 66 into front wheel drive position before the shifting of the rod 64 can be completed. This interlock operated by the first speed rod 2 consists of a sliding bolt 89 mounted in a suitable guide in the transfer gear box parallel to the rod 740 and coacting at one end with a groove or notch 91 in the first and second speed rod 2 and at its other end thrusting against one arm of a locking key 92 pivoted between its ends at 93 in a recess in the rod 66, the other arm having a nose 94 for entering an internal notch in the bore of the sleeve 84. When the first and second speed rod 2 is shifted from neutral to first speed position, the hump or high point 79 at one end of the wide notch 78 shifts the bolt 89 and effects the rocking of the locking key 92 to lock its nose 94 in the notch of the sleeve 84. Hence, upon shifting of the first speed rod 2 into first speed position, either by selecting and shifting said rod 2 or by selecting and shifting the reverse rod 4, the front wheel drive shift rod 66 will be locked to the collar 84, so that upon shifting of the low ratio shift rod 64 of the transfer gearing, the front wheel drive shift rod must be shifted to shift the front wheel drive clutch 53 into engaged position.

The general operation is as follows:

The clutch 52 is normally in position to connect the output shaft 12 and tail shaft 50 in direct drive relation and the clutch 54 is in "out" position. The front wheel drive clutch 53 is also in "out" position. Thus, in the normal operation, the tail shaft 50 for the rear or track drive can be operated through the forward speeds and reverse of the main gear box. When it is desired to use a front wheel drive, as on rough roads or rough terrain, or in any place, except on smooth or paved roads, the front wheel drive clutch 53 can be shifted into clutching position only when the first and second speed rod 2 is in neutral or in first speed position. It is so shifted by operating the lever 68 to shift the rod 66, but on account of the interlock 740 can only be shifted when the first and second speed rod is in neutral or first speed position. When the rod 2 is in neutral position or first speed position, the rod 66 must be shifted out of clutching position before a shift can be made into a second speed forward or before the third and fourth speed rod 3 can be shifted from neutral. By shifting the lever 67, the shift rod 64 controlling the low gear ratio in the transfer gear box is operated to shift out the clutch 52 and to shift in the clutch 54. The front wheel drive clutch 53 must thus be shifted in whenever the rod 64 controlling the low gear ratio of the transfer gearing is operated to engage the clutch 54 and disengage the clutch 52, because if an attempt is made to shift the shift rod 64 when the front wheel shift rod 66 is in "out" position, the shifting of the first and second speed rod into first speed position will cause the front wheel drive shift rod 66 to be locked to the sleeve 84, which is encountered by the shoulder 82 on the fork of the shift rod 64, and hence the rod 66 shifted into front wheel drive. When the rod 64 is shifted into low gear ratio and because of the interlock 740, such shifting into low gear ratio compels the shifting in of the front wheel drive clutch.

The gear 22 is normally idle intermediary shiftable into active position in mesh with the gear 23 to obtain reverse speed through the front gear train 13, 15, 16, 22, 23, 25 and 11. Hence, when the reverse shift rod 4 is selected and shifted, the gear 22 is shifted into operative position and the first and second speed shift rod 2 shifted into first speed position through the motion transmitting means including the lever 33 and ball or clutch 40, to clutch the final drive gear 11 of the first speed train to the transmission shaft 12.

The lever 33 with the coupling member 40 constitutes motion transmitting means between the reverse shift rod 4 and the first and second forward speed shift rod 2, the coupling member 40 operating to couple the lever 33 into effective motion transmitting relation only upon the movement of the selecting and shifting lever 31 against the slide 39 which operates the coupling member or ball 40 into coupling or locking position.

The shift rod 64 is one of two shift rods optionally shiftable by means of its own shifting handle lever 67 to produce a gear change in the transfer box. The rod 66 constitutes a second shift rod, shiftable to effect an additional gear change or effect the drive to the front wheels or driving axle of the vehicle, the rod being shiftable by its own hand shifting lever 68. The shoulders 82 and 85 on the rods respectively, which project into each other's path, require the shifting of the rod 66 to effect front wheel drive when the rod 64 is shifted to shift its fork 65 and the low speed clutch 52 in the transfer box, or in other words, when the main gearing is shifted into first speed forward, the lock 92 is operated to lock the shift rod 66 to the collar 84, so that now if the shift rod 64 is operated by its handle 67, the second shift rod 66 will be automatically operated to cut in the front wheel drive when the low speed clutch 54 in the transfer gear box is shifted to "in" position.

What we claim is:

1. A gear shifting mechanism for variable speed transmission gearing including a plurality of shift rods shiftable from neutral, a selecting and shifting lever for selecting any one of the rods when all are in neutral, motion transmitting means between two of the rods operable on the selecting and shifting of one only of said two rods to shift the other of the two rods into a predetermined operative position out of neutral 2. The combination of a variable speed operated shifting mechanism in which reverse speed is obtained in conjunction with one of the forward gear ratios by shifting an intermediary into said one of the forward gear trains when said forward gear train is in operative driving relation; of a shifting mechanism including a plurality of shift rods shiftable from neutral, a selecting and shifting lever for selecting and shifting any one of the rods when all are in neutral, motion transmitting means between the reverse shift rod and the rod controlling the forward speed ratio through which reverse is effected, including a normally idle coupling between the two rods acting in conjunction, operable upon the selecting and shifting of the reverse speed rod only, to effectively couple the reverse rod to the other rod, when the reverse rod is selected.

3. A gear shifting mechanism for variable speed transmission gears including a plurality of shift rods shiftable from neutral, and a selecting and shifting lever for selecting any one of the rods when all are in neutral, one of the rods being shiftable in opposite directions from neutral to effect different forward speeds, and another of the rods operable in one direction from neutral to effect reverse speed in conjunction with the former rod when the latter is in one only of its shifted positions, and motion transmitting means between the two rods for shifting the first rod out of neutral position when the reverse rod is selected and shifted from neutral to effect reverse, including a coupling operable to couple the reverse rod and the motion transmitting means, only when the reverse rod is selected.

4. A gear shifting mechanism for variable speed transmission gears including a plurality of shift rods shiftable from neutral, and a selecting and shifting lever for selecting any one of the rods when all are in neutral, one of the rods being shiftable in opposite directions from neutral to effect different forward speeds, and another of the rods operable in one direction from neutral to effect reverse speed in conjunction with the former rod when in one only of its shifted positions, and motion transmitting means between the two for shifting the first rod out of neutral position when the reverse rod is selected and shifted from neutral to effect reverse, including a lever extending transversely of the shift rods and pivoted to a support fixed from movement with the shift rods, the lever being pivotally connected to the forward speed shift rod, a coupling operable to couple the reverse shift rod and the motion transmitting means, the lever being pivotally connected to the coupling, said coupling including a member operable out of normal position into coupling position by the selecting movement of the selecting and shifting lever to select the reverse rod.

5. A gear shifting mechanism for variable speed transmission gears including a plurality of shift rods shiftable from neutral, and a selecting and shifting lever for selecting any one of the rods when all are in neutral, one of the rods being shiftable in opposite directions from neutral to effect different forward speeds, and the other of the rods operable in one direction from neutral to effect reverse speed in conjunction with the former rod when in one only of its shifted positions, the rods having blocks for coacting with the lever, the reverse rod normally slidably fitting its block, motion transmitting means between the block of said rods for shifting the first of the two shift rods out of neutral position into shifted position, when the reverse rod is selected and shifted out of neutral position, including a coupling operable by the selecting movement of the lever when selecting the reverse rod to lock the reverse block and the reverse rod from relative sliding movement, the coupling including a spring-pressed plunger arranged in the path of the selecting movement of the selecting and shifting lever and a part operated thereby to lock the coupling to the reverse shift rod when the spring-pressed member is moved out of its operative position by the selecting movement of the selecting and shifting lever.

6. In a gear shifting mechanism, a first shift rod, optionally shiftable at any time to produce different gear changes, a second shift rod shiftable to effect an additional gear change, means for shifting each of the rods, and a main shift rod operable from neutral, means operated by the main shift rod when shifted out of neutral into a predetermined operative position for causing the second rod to be shifted, if unshifted, when the first shift rod is shifted into operative position, whereby the second shift rod is operated upon the operation of the first shift rod only when the main shift rod is in a predetermined shifted position.

7. In a gear shifting mechanism, a first shift rod, optionally shiftable at any time to produce different gear changes, a second shift rod shiftable to effect an additional gear change, means for shifting each of the rods, and a main shift rod operable from neutral, means operated by the main shift rod when shifted out of neutral into a predetermined operative position for causing the second rod to be shifted, if unshifted, when the first shift rod is shifted into operative position, whereby the second shift rod is operated upon the operation of the first shift rod only when the main shift rod is in a predetermined shifted position, the last means including shoulders provided on the first and second rods, the shoulder on the second rod projecting into the path of the shoulder on the first other rod when each of the first and second rods is in inoperative or starting position, to be energized thereby when the first rod is being shifted and the second rod out of shifted position.

CARL D. PETERSON.
ELMER J. BARTH.